(12) United States Patent
Wolters

(10) Patent No.: US 6,523,528 B1
(45) Date of Patent: Feb. 25, 2003

(54) GAS METERING SYSTEM

(75) Inventor: Leendert Wolters, Rhoon (NL)

(73) Assignee: Heinzmann International GmbH, Schonau (DE)

(*) Notice: Subject to any disclaimer, the term of this patent is extended or adjusted under 35 U.S.C. 154(b) by 0 days.

(21) Appl. No.: 09/965,859

(22) Filed: Oct. 1, 2001

(51) Int. Cl.$^7$ ............................................. F02M 21/02
(52) U.S. Cl. ....................................................... 123/527
(58) Field of Search ......................................... 123/527

(56) References Cited

U.S. PATENT DOCUMENTS 4,953,516 A * 9/1990 Van der Weide et al. ... 123/527
5,388,607 A * 2/1995 Ramaker et al. .............. 137/88

* cited by examiner

Primary Examiner—Paul J. Hirsch
(74) Attorney, Agent, or Firm—Young & Thompson

(57) ABSTRACT

Gas metering system for an internal combustion engine. A gas pressure regulator is connected to a venturi located in the inlet of the internal combustion engine through a main adjusting screw being electrically adjustable. The control is provided in which engine rpm, load and mixture temperature are inputted. To provide for applicability for different types of engines and to obtain the ideal air fuel ratio for each operating condition, the control module of the adjustable main adjusting screw is provided with adjusting means. The surface area of the gas outflow openings in the venturi throat is the only required information for the control module to identify different types of engines and fuels and to adjust the gas flow automatically.

9 Claims, 2 Drawing Sheets

GAS METERING SYSTEM

FIELD OF THE INVENTION

This invention relates to a gas metering system for an internal combustion engine. More particular this invention relates to industrial engines for combined-heat-power applications, for powering generating sets and for heavy duty vehicles.

BACKGROUND OF THE INVENTION

It is generally known to operate industrial engines with gas of various composition. In view of environmental regulations and in view of engine performance, a system is required which is flexible and compensates for different operating conditions, more particularly, for different loads and different compositions of supplied to the related engine.

To that end sophisticated closed loop control systems are known. However, the components of such closed loop systems increase the costs thereof as well as reliability.

A very simple and well known system to feed an engine with gas is to meter gas through a pressure regulator and a venturi provided in the inlet of the internal combustion engine. According to Bernoulli's law, a constant air-fuel ratio can be guaranteed through the use a pressure regulator functioning at constant (near zero) pressure and equal to the inlet pressure of the venturi. To provide a first adjustment, a main adjusting screw is provided between the pressure regulator and the venturi. In more sophisticated systems, electronic adjustment of the adjustment screw during operation is made possible to optimize the air fuel ratio for all operating conditions.

SUMMARY OF THE INVENTION

The invention aims to provide a relatively simple gas metering system for an internal combustion engine which can meet emission requirements at all operating conditions on the one hand and provides easy starting on the other hand.

It is a further aim of the invention to provide a gas metering system, which can be simply adapted to different types of engines. Different types of engines means a different cranking volume and/or different member of cylinders.

It is a further aim of subject invention to provide a gas metering system making operation with various gases and/or gas compositions possible, even with a limited number of hardware executions.

According to one aspect of the invention, a gas metering system is provided for an internal combustion engine comprising a gas pressure regulator having an inlet and gas outlet and being arranged to provide gas at said outlet at a substantially constant pressure, an outlet line being connected to said outlet and comprising an adjustable valve, a venturi device having a main passage for inlet air for said internal combustion engine and at least one auxiliary passage opening in the throat section of said venturi and connected to said outlet line, control means for controlling said adjustable valve, having inputs for at least engine rpm and engine load, a memory/processing unit for converting said inputs into an output for said adjustable valve, and adjusting means for adjusting said control to the related internal combustion engine, said adjusting means comprising setting means for introducing values corresponding to the surface area of said at least one auxiliary passage.

According to the invention, a relatively low number of input/output ports and memory addresses are required so that a relatively cheap processor can be used keeping the costs for the control means as low and the reliability as high as possible. Preferably, the control means comprises a set of parameters for the reference engine to be encountered. This set comprises the cylinder displacement of the engine, gas composition, etc. It has been found that the adjusted values of the total surface area of the auxiliary passage of a subject engine in combination with this set of parameters generate about the same A/F ratio as a reference engine.

It is presumed that for example the venturi supplier determines the surface area of the auxiliary passage from the engine data and fuel composition as specified by the customer. A smaller engine will have a smaller surface area of both the main passage and the auxiliary passage(s) of the venturi. Usually the surface area of auxiliary passage(s) is labeled at the related venturi, can be deduced from its type number, or from its physical layout. Based on that information, in the field a simple setting can be made in the control according to the invention.

The engine load input can be deduced in several ways known from the prior art. According to a further aspect of the invention the metering unit comprises a commercially available pressure regulator providing a somewhat positive outlet pressure in order to improve starting at cranking speed. This is particularly valuable engines having an inlet compressor.

According to a further preferred embodiment, further motorized adjustments means are provided for controlling the air-to-fuel ratio through said valve. As an additional feature, software means are provided to give enrichment at lower engine loads and, more particularly, at a cranking speed of the engine and during a cold start. Also means are provided to make the air/gas mixture leaner at higher intake temperatures.

The motorized main adjusting valve is preferably realized as a slide valve with an opening that is exponentially-shaped giving a nearly constant increase/decrease in surface area at each incremental displacement.

Optionally the metering system can be equipped with a closed loop control feature. The underpressure in the throat of the venturi is a measure of the mixture flow. Only the desired air fuel ratio will generate the desired mixture flow, respectively underpressure, at a given engine power. It is self-evident that the mixture flow will be reduced at rich and increased at lean air fuel ratio conditions. The control means can also have inputs for the measurement of the throat depression and the generated electrical power. The adjustable valve will be controlled as long as the measured underpressure corresponds to the value that belongs to the desired underpressure at that engine power. Alternatively this measured underpressure can be replaced by a calculated underpressure in order to avoid the application of an extra sensor.

BRIEF DESCRIPTION OF THE DRAWINGS

The invention will be further elucidated referring to the figures wherein.

DESCRIPTION OF THE PREFERRED EMBODIMENTS

Figure 1:
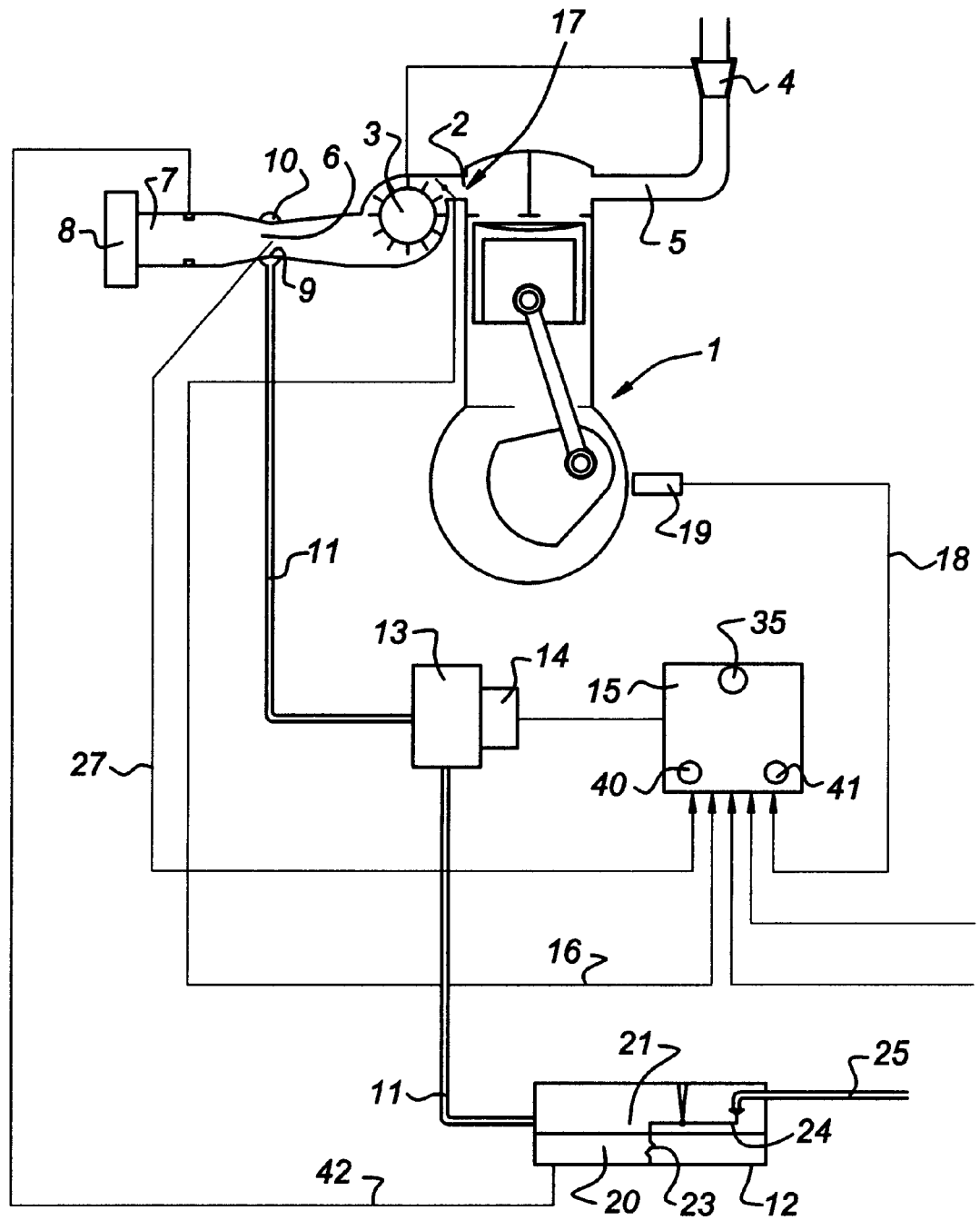
FIG. 1 schematically shows an internal combustion engine provided with a gas metering system according to the invention FIG. 2 schematically shows an adjustable valve according to the invention.
Figure 2:
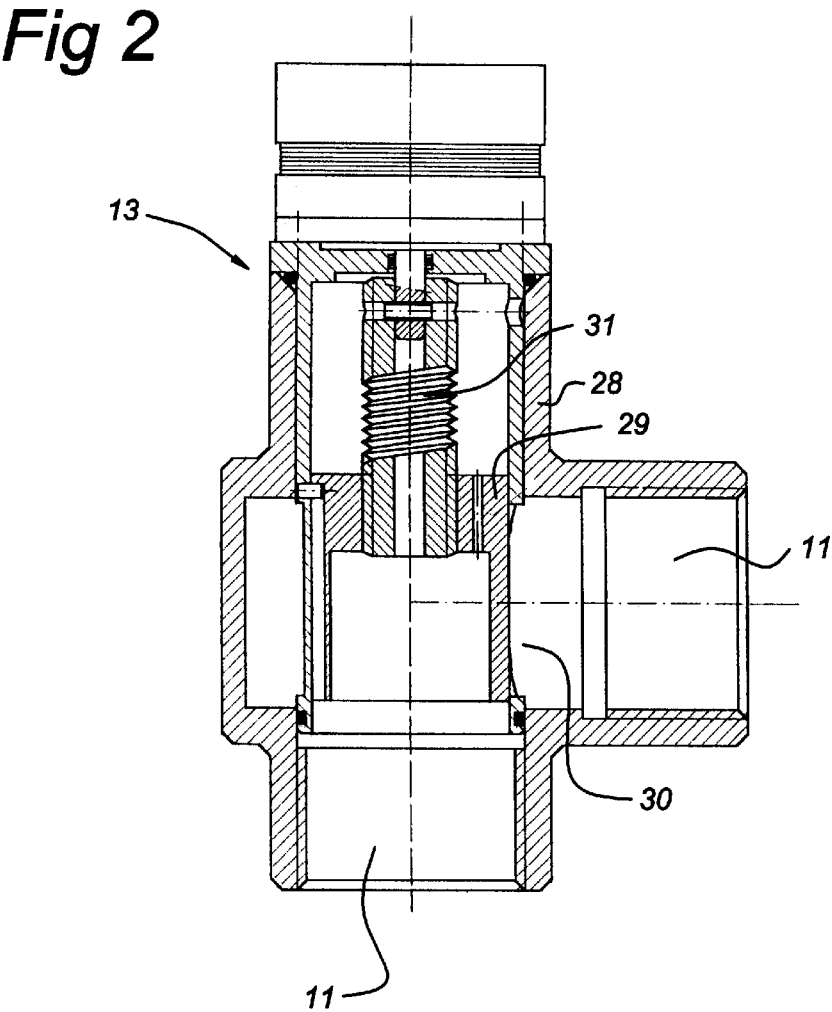

In FIG. 1, an internal combustion engine is generally referred to by 1. In the inlet duct 2 thereof a compressor 3 is provided that is connected to a turbine 4 of the outlet duct 5 of the engine. Upstream from the compressor 3 a venturi 6 is provided having an inlet 7 for the main flow of air from air filter 8. In venturi 6 a number of openings 9 are connected through a ring shaped channel 10 to the outlet line 11 of a gas pressure regulator 12. A motorized main adjusting screw 13 of which details are clear from FIG. 2 is controlled by control 15. Control 15 has an input line 16 connected to a temperature sensor 17. Input line 18 is connected with a pickup 19 for determining rotational speed of the engine. Control 15 is adapted for connection to a display and has two keyswitch 35 protected potentiometers 40 and 41.

Potentiometer 40 functions to adapt the air fuel ratio whilst potential 41 is provided to enter data with regard to venturi 6 used (carburetor identification). Several other inputs for control 15 are provided such as an input for the power of the engine and/or load as well as underpressure (line 27). Gas pressure regulator unit 12 comprises a conventional gas pressure regulator of any make. Outlet 24 opens a gas supply 25 into a compartment 20 in which a membrane 21 is provided. Spring 23 compensates for the weight of the membrane 20 and can be adjusted to provide a small positive outlet pressure. Adaptation of the operating characteristics can of course be made by using an adapted spring 23. The balance line 42 compensates the gas outlet pressure in line 11 for changes of air filter restriction or, in case of the venturi is located downstream of the compressor, for boostpressure.

If underpressure is generated at outlet line 11 membrane 21 will move into compartment 20 liberating opening 24 so that gas flows into compartment 20 increasing the pressure therein so that membrane 21 is moved back to close opening 24 again.

Pressure regulator 12 can be combined with an evaporator to evaporate liquefied gas to vapor.

Control 15 comprises a map in which a restricted number of addresses are provided to control stepping motor 14 depended from the different inputs. This control can be relatively simple.

Details of valve 13 emerge from FIG. 2. In housing 28 a slide 29 is provided which can be moved to increase or decrease the area of an opening 30. Operation is through a screw spindle 31 which is connected to steppermotor 14. Opening 30 is exponentially-shaped.

Control 15 is provided with an additional setpoint which represents the total surface area of openings 9. This surface area or a value corresponding thereto can be displayed by means of a service tool like a Voltmeter or from a remote display.

According to the invention an adjustment of this value can be made through potentiometer 41. It is evident that this value also can be adjusted by changing the parameter set, through the software of the system.

According to the invention a correction is made for the relative size of the engine based on the entered surface area of the auxiliary openings 9.

Instead of entering the surface area another value corresponding to the total surface area of the auxiliary opening can be entered such as the opening of the throat or the type of venturi.

Surprisingly, it has been found that such an adjustment is sufficient to identify the subject engine to the control means. As the surface area of the auxiliary passage as calculated by the venturi supplier is the outcome of a calculation that has been based on the gas composition, the cylinder displacement and the air-fuel ratio, a clear relation between the reference engine and the subject engine exists, at least as long as the subject engine is meant to operate in the same mode. The information obtained from the surface area of the auxiliary passage provides full compensation of the lack of information about the subject engine and makes the performance or the subject engine equal to the reference engine. If the reference engine has a parameter set for lean burn operation, the subject engine will not automatically perform right if applied in stoichiometric mode.

The characteristics of the venturi 6 can also be compensated. That is, the values to be stored in control 15 can be determined through experiments with venturi 6 and generally are valid for more than one venturi type.

Figure 3:
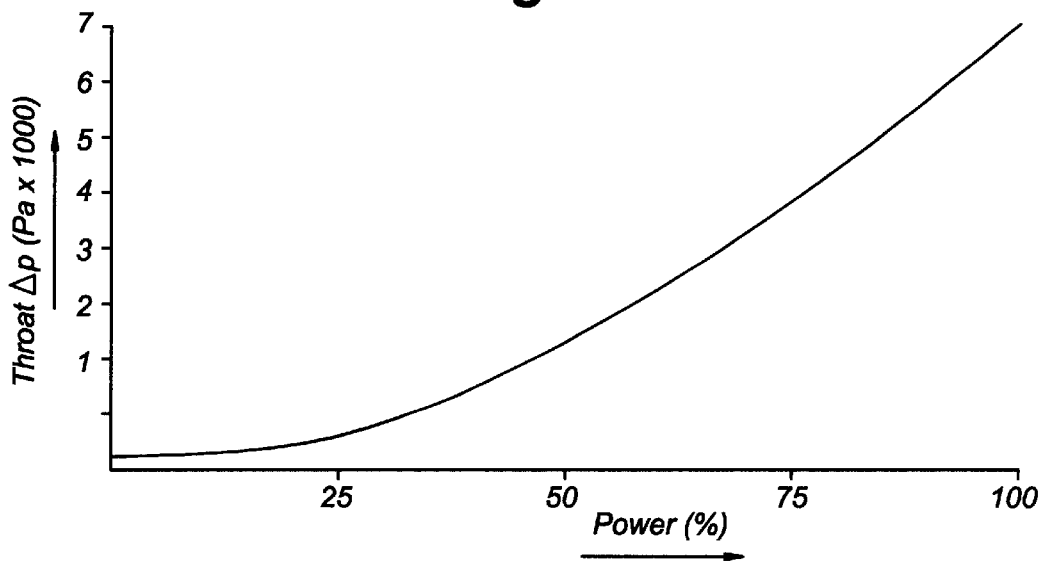
FIG. 3 shows in a graph ΔP against power.

When the closed loop mode is switched on, the power-sensor signal and the underpressure sensor signal from line 27 should be connected to the control means. FIG. 3 shows the underpressure over the venturi, i.e., the line 11, versus power. The line drawn shows the optimum relationship. If in a practical situation at a determined power ΔP is higher, the mixture is too lean while at a ΔP lower than the indicated line, the air fuel ratio is too low.

What is claimed is:

1. Gas metering system for an internal combustion engine, comprising:

a gas pressure regulator having an inlet and a gas outlet and being arranged to provide gas at said gas outlet at a substantially constant pressure;

an outlet line connected to said gas outlet and comprising an adjustable valve;

a venturi having a main passage for inlet air for said internal combustion engine and at least one auxiliary passage opening in a throat section of said venturi and connected to said outlet link;

control means for controlling said adjustable valve, having inputs for at least engine rpm and load and a memory/processing unit for converting said inputs into an output for said adjustable valve; and adjusting means for setting said control means to the related internal combustion engine, said adjusting means comprising setting means for introducing a value corresponding to a surface area of said at least one auxiliary passage.

2. The gas metering system according to claim 1, further comprising a closed loop feature based on the relation between an underpressure in the throat of the venturi, a desired air to fuel ratio and generated engine power.

3. The gas metering system according to claim 1, wherein said pressure regulator is arranged to provide gas at a pressure between 0 and +4" water gauge higher than an inlet pressure of the venturi.

4. The gas metering system according to claim 1, wherein said control means is provided with further adjusting means for controlling the gas flow through said adjustable valve.

5. The gas metering system according to claim 4, wherein said further adjusting means are arranged for controlling the gas flow through said adjustable valve at all load, speed, temperature and fuel conditions of said internal combustion engine.

6. The gas metering system according to claim 5, wherein the opening of said adjustable valve is exponentially shaped.

7. The gas metering system according to claim 1, wherein an inlet of said engine comprises a compressor downstream or upstream of said venturi.

8. A gas metering system for an internal combustion engine, comprising:

a gas pressure regulator having a gas outlet that provides gas at a substantially constant pressure;

an adjustable valve considered to said gas outlet;

a venturi that receives inlet air for the internal combustion engine and that has a throat with at least one auxiliary passage that is connected to said gas outlet through said adjustable valve;

a controller that controls said adjustable valve based on engine speed and load, said controller having a selectively adjustable input that inputs to said controller a value corresponding to a surface area of said at least one auxiliary passage.

9. The gas metering system of claim 8, wherein said selectively adjustable input is a potentiometer.

* * * * *